US012754731B2

(12) United States Patent
Hallberg et al.

(10) Patent No.: US 12,754,731 B2
(45) Date of Patent: Oct. 6, 2026

(54) TRUSTED SERVER ORCHESTRATION FRAMEWORK

(71) Applicant: Google LLC, Mountain View, CA (US)

(72) Inventors: Jacob Mark Hallberg, Sunnyvale, CA (US); Yuguang Tong, Sunnyvale, CA (US); Shruti Murali, Sunnyvale, CA (US); Tenghui Liu, Sunnyvale, CA (US); Oscar Ka Ho Chow, Richmond Hill (CA)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 18/850,143

(22) PCT Filed: Oct. 17, 2023

(86) PCT No.: PCT/US2023/035275

§ 371 (c)(1),
(2) Date: Sep. 24, 2024

(87) PCT Pub. No.: WO2025/085052

PCT Pub. Date: Apr. 24, 2025

(65) Prior Publication Data

US 2026/0178304 A1 Jun. 25, 2026

(51) Int. Cl.
*G06F 8/65* (2018.01)
*G06F 9/445* (2018.01)
*G06F 9/451* (2018.01)

(52) U.S. Cl.
CPC ............ *G06F 8/65* (2013.01); *G06F 9/44505* (2013.01); *G06F 9/451* (2018.02)

(58) Field of Classification Search
CPC ......... G06F 8/65; G06F 9/44505; G06F 9/451
See application file for complete search history.

(56) References Cited

U.S. PATENT DOCUMENTS 6,516,349 B1 2/2003 Lieberman
8,983,860 B1 3/2015 Beda, III et al.
(Continued)

FOREIGN PATENT DOCUMENTS

CN 115437994 A * 12/2022 ........... G06F 15/177
JP 2019-035996 3/2019
WO WO 2022197304 9/2022

OTHER PUBLICATIONS

Github.com [online], "FLEDGE.md" Jan. 2021, retrieved on Feb. 7, 2025, retrieved from URL <https://github.com/WICG/turtledove/blob/main/FLEDGE.md>, 70 pages.
(Continued)

*Primary Examiner* — Andrew Suh
(74) *Attorney, Agent, or Firm* — Fish & Richardson P.C.

(57) ABSTRACT

Methods, systems, and apparatus, including medium-encoded computer program products, for secure workflows that enhance data security are described. In one aspect, a method includes receiving, by a secure distribution system and from a client device, a digital component request comprising a set of data, in response to receiving the digital component request a customization orchestrator of the secure distribution system identifies a multi-stage workflow for selecting a digital component from candidate digital components of a given content platform based on the set of data. The multi-stage workflow includes a sequence of customization modules that are communicatively coupled to one another by a common data bus. Each customization module includes a set of worklets that include one or more customized worklets provided by the given content platform and one or more standard worklets used in customization modules of multiple content platforms.

20 Claims, 11 Drawing Sheets

(56) References Cited

U.S. PATENT DOCUMENTS

| | | | | |
|---|---|---|---|---|
| 9,916,133 | B2 | 3/2018 | Jubran et al. | |
| 10,680,977 | B1 * | 6/2020 | Sarusi | H04L 49/1546 |
| 11,366,681 | B2 * | 6/2022 | Liguori | G06F 9/54 |
| 2011/0307304 | A1 * | 12/2011 | Mercuri | G06Q 10/101 707/748 |
| 2020/0314086 | A1 * | 10/2020 | Zeck | G06F 3/0482 |
| 2021/0385251 | A1 | 12/2021 | Crabtree et al. | |
| 2022/0172183 | A1 | 6/2022 | Wong et al. | |

OTHER PUBLICATIONS

International Search Report and Written Opinion in International Appln. No. PCT/US2023/035275, mailed on Apr. 16, 2024, 16 pages.
Office Action in Japanese Appln. No. 2024-555197, mailed on Dec. 16, 2025, 5 pages (with English translation).
International Preliminary Report on Patentability in International Appln. No. PCT/US2023/035275, mailed on Apr. 30, 2026, 10 pages.
Notice of Allowance in Japanese Appln. No. 2024-555197, mailed on Jun. 23, 2026, 5 pages (with English translation).
Office Action in Indian Appln. No. 202417065650, mailed on May 27, 2026, 8 pages (with English translation).

* cited by examiner

TRUSTED SERVER ORCHESTRATION FRAMEWORK

CROSS-REFERENCE TO RELATED APPLICATION

This application is a National Stage Application under 35 U.S.C. § 371 and claims the benefit of International Application No. PCT/US2023/035275, filed Oct. 17, 2023, the disclosure of which is incorporated herein by reference and for all purposes.

TECHNICAL FIELD

This specification relates to securely executing computing workflows in ways that enhance data security and data privacy.

BACKGROUND

Data security is vital for computing systems connected to public networks, such as the Internet. Computer systems are often protected from unauthorized access and data breaches using network security technologies, such as firewalls.

A virtual machine provides an emulated version of a computer system. A virtual machine can include emulated processing units (e.g., a central processing unit (CPU)), memory, network interfaces, and/or other computing components.

SUMMARY

This specification describes technologies related to securely performing workflows that enable non-disclosed and otherwise proprietary customization of the stages of the workflow in ways that prevent other parties from accessing the customization. A workflow is a set of executable stages through which a unit of work passes from initiation to completion. The technologies include performing workflows in isolated environments, e.g., in virtual machines and/or trusted execution environments (TEEs), that provide secure sandboxes while still supporting full-function workflows. The techniques can further include applying constraints on inputs to and/or outputs from workflows or portions thereof to maintain user privacy, prevent access to confidential customizations, and enhance system integrity.

In general, one innovative aspect of the subject matter described in this specification can be embodied in methods including the operations of receiving, by a secure distribution system and from a client device, a digital component request comprising a set of data: in response to receiving the digital component request: identifying, by a customization orchestrator of the secure distribution system, a multi-stage workflow for selecting a digital component from candidate digital components of a given content platform based on the set of data, wherein the multi-stage workflow includes a sequence of customization modules that are communicatively coupled to one another by a common data bus, each customization module including a set of worklets including one or more customized worklets provided by the given content platform and one or more standard worklets used in customization modules of multiple content platforms; executing, by the secure distribution system, each customization module of the multi-stage workflow in the sequence defined by the multi-stage workflow to select the digital component, the executing including, for each customization module: providing, by the customization orchestrator, a set of input data to the customization module over the common data bus; executing each worklet of the customization module in a sequence defined by the customization module to generate a set of output data; and sending, by the customization orchestrator, the output data to the common data bus, wherein the output data for a particular customization module of the sequence of customization modules comprises data indicating a given digital component selected by the particular customization module based on the set of input data provided to the particular customization module; and causing the client device to present the given digital component. Other implementations of this aspect include corresponding apparatus, systems, and computer programs, configured to perform the aspects of the methods, encoded on computer storage devices.

These and other embodiments can each optionally include one or more of the following features. Some aspects include receiving, from the common data bus, respective candidate digital components from multi-stage workflows of multiple content platforms including the given digital component from the multi-stage workflow of the given content platform; and selecting, by the digital component selection module, the given digital component from among the candidate digital components.

In some aspects, each worklet of each set of worklets includes an operation defined by a portion of code configured to process data. The portion of code of the operation associated with each customized worklet is a customized portion of code provided by the given content platform. The portion of code of the operation associated with each standard worklet is a portion of code defined by an entity that manages operation of the secure distribution system.

In some aspects, the customization orchestrator transforms the set of input data into a defined set of inputs associated with the customization module.

In some aspects, the customization orchestrator transforms the output data into a defined set of outputs associated with the customization module. Each customization module further can include a policy engine. The policy engine can determine whether the set of input data and the output data adhere to a set of data policies. The policy engine can determine whether the set of input data is provided by the customization orchestrator to the customization module based on whether the set of input data adheres to the set of data policies. The policy engine can determine whether the output data is sent by the customization orchestrator to the common data bus based on whether the output data adheres to the set of data policies.

In some aspects, the common data bus is a common data bus comprising one or more data channels. Each data channel of the one or more data channels can be a user data channel, a candidate data channel, a contextual data channel, or an auxiliary data channel.

In some aspects, each customization module includes a local data bus. The set of worklets of each customization module can be communicatively coupled to one another by the local data bus. Each customization module can include an operation orchestrator configured to transfer data between the set of worklets over the local data bus.

In some aspects, one or more of the customization modules are located in a trusted execution environment on the secure distribution system, and one or more of the customization modules are located on the client device.

In some aspects, executing, by the secure distribution system, each customization module of the multi-stage workflow in the sequence defined by the multi-stage workflow to select the digital component, includes executing the one or more customization modules in a concurrent manner.

In some aspects, executing, by the operation orchestrator, each worklet of the customization module in a sequence defined by the customization module to generate a set of output data includes executing the one or more worklets in a concurrent manner.

Particular embodiments of the subject matter described in this specification can be implemented so as to realize one or more of the following advantages. The techniques described in this document can be used to select digital components from a variety of content providers (e.g., content platforms) while preserving the privacy of the user. In addition, the techniques enable such digital components to be provided by content platforms while also preserving the confidentiality and integrity of techniques and proprietary logic used by the content platforms. As described further below, the system can execute stages of a workflow that is used to select digital components and stages that involve sensitive user data and/or confidential techniques and/or logic can be executed in an isolated environment, such as on a server in a TEE and/or in virtual machines. Executing code in a TEE protects the privacy of the content requestor (e.g., user) since the TEE can constrain access to information about the requestor. Executing code in a virtual machine protects the content platform that supplied the code since the virtual machine can ensure that the content platform's customizations remain isolated such that other content platforms cannot access the content platform's customizations. The techniques can include encrypting code for the customizations, which ensures the security, confidentiality, and integrity of the code.

Additionally, the system can implement customization of the stages of a workflow using customization modules. Customization modules allow the content platform to utilize user device and/or trusted server resources of a secure distribution system to enable a high level of utility and operability. The techniques can also be used to ensure that data produced by stages of a workflow meet certain criteria, such as criteria that defines the inputs and the outputs of each of the customization modules. Such criteria can further protect requestor privacy by ensuring that stages only provide data that satisfies data constraints to other stages and/or to content platforms. Executing customization modules that include customized code in the form of worklets in a trusted server (e.g., a secure distribution system) that provides isolated execution environments enables digital components to be selected quickly, accurately, and efficiently while also securely protecting the security of user data and confidential customized code of the content platforms. The described systems and techniques also enable such digital component selection and distribution processes to be performed using fewer resources (e.g., CPU cycles) and with better debuggability as compared to approaches that use a standard TEE.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
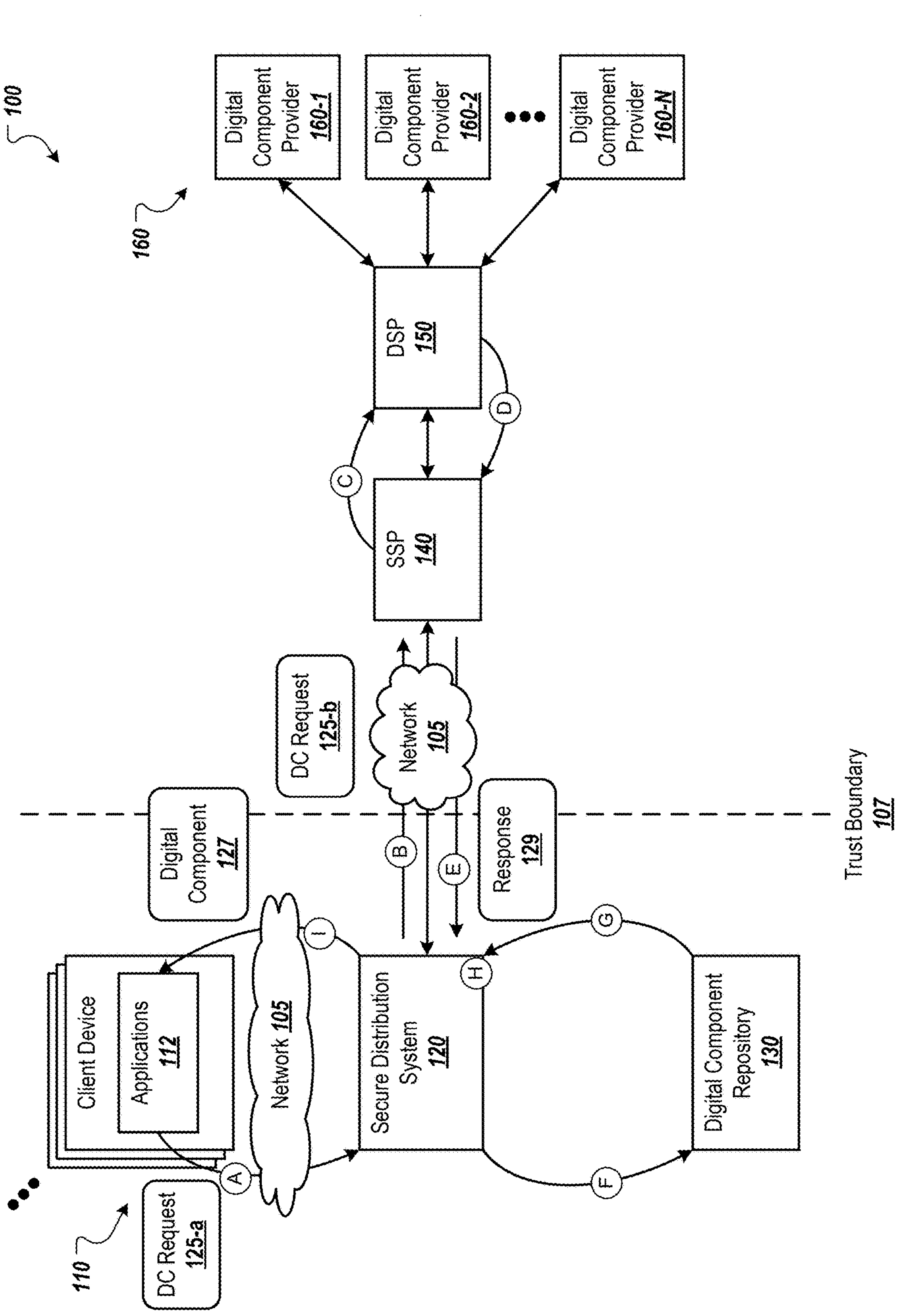
FIG. 1 shows an example environment in which a secure distribution system distributes digital components to client devices in a privacy preserving manner.

In general, this document describes systems and techniques for selecting and presenting digital components at client devices of users in ways that protect user privacy and confidential data of content platforms. A secure distribution system can include one or more computers (e.g., servers) configured to perform customized digital component selection processes that use sensitive user data so that the user data is not provided to any other entity. The secure distribution system can host and execute selection logic (which can be in the form of code) of various content platforms when selecting digital components and/or generating selection parameters for the digital components based on user data to ensure that no other entity can access the selection logic of the content platform. In this way, both the data of the users and the logic of the content platforms are kept secure.

Ensuring the privacy of personal data is a requirement of many computing systems, especially those connected to public networks such as the Internet. In addition, some jurisdictions have regulations that protect privacy. Such privacy guarantees can include not only how data is stored, but also processes that control data sharing with third parties.

However, some data sharing can provide utility to users, especially when a digital component provider attempts to customize the digital component selection process for the users. For example, private data, including aggregate private data, can be used to locate content that is both relevant and interesting to the user, if the user authorizes such uses of the user's data. Absent information about the user, e.g., interests of the user, it can be challenging for a system to provide relevant content.

In addition, executing code from multiple content platforms can create policy adherence issues and risks of leakage of the content platforms to others. For example, one content platform might attempt to share data with another content platform that does not adhere to certain data policies, such as policies related to privacy or policies associated with a user age restriction. In another example, a content platform might attempt to use its code to determine how the code of another content platform operates, which can violate certain policies related to privacy and/or content platform confidentiality. Thus, a need exists to ensure overall system integrity and system customizability while still allowing non-disclosed, proprietary code to operate on private data.

This specification describes a workflow system that enables content platforms to have code for each stage of the workflow, or for a subset of stages, executed in a trusted execution environment (TEE) or other secure or sandboxed environment of a secure distribution system. The results of the workflow can be content, e.g., digital components, presented at client devices of users. As described in more detail below, a workflow of a content platform can be implemented using customization modules that each include one or more worklets and at least some of the worklets can be created or customized by the content platform.

In order to preserve user privacy, the system can ensure that each customization module is permitted to access only data that does not violate data policies, and that the output data generated by each customization module adheres to the policies, e.g., by being a defined set of outputs. In addition, the system can execute each customization module separately and/or concurrently. Executing the customization modules in isolation of the TEE provides protection to these valuable data assets. In addition, the TEE ensures the integrity of the customized worklets and/or other customized code of a content platform by ensuring that such customizations cannot undergo tampering.

FIG. 1 is a block diagram of an example environment 100 in which a secure distribution system 120 distributes digital components to client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to the secure distribution system 120 and connects the secure distribution system 120 to content platforms, such as supply side platforms (SSPs) 140 and/or demand side platforms (DSPs) 150. The network 105 can also connect the various content platforms to one another and/or to digital component providers 160, e.g., to servers of the digital component providers 160.

A client device 110 is an electronic device capable of requesting and receiving online resources over the network 105. Example client devices 110 include personal computers, gaming devices, mobile communication devices, digital assistant devices, augmented reality devices, virtual reality devices, and other devices that can send and receive data over the network 105. A client device 110 typically includes a user application, such as a web browser, to facilitate the sending and receiving of data over the network 105, but native applications (other than browsers) executed by the client device 110 can also facilitate the sending and receiving of data over the network 105.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present, e.g., display, electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request 125-*a* that requests a digital component for presentation in the digital component slot. In some implementations, the digital component slot and/or the resource can include code (e.g., scripts) that cause the application 112 to request a digital component from the secure distribution system 120.

A digital component request 125-*a* sent by a client device 110 can include data that can be used to select a digital component for presentation to the user of the client device 110. For example, the digital component request 125-*a* can include sensitive user data related to a user of the client device 110 and/or non-sensitive data, e.g., contextual data. The sensitive user data can include, for example, data identifying user groups that include the user as a member. The user groups can include interest-based groups. Each interest-based group can include a topic of interest and a set of members identified (e.g., determined or predicted) to be interested in the topic. The user groups can also include, for example, groups of users that performed particular actions at electronic resources (e.g., websites or native applications) of publishers. For example, a user group can include users that visited a website, users that requested more information about an item, interacted with (e.g., selected) a particular digital component and/or added an item to a virtual cart to potentially acquire the item. The user data for a user can also include topics of interest of the user, user profile data, attributes (e.g., demographic attributes) of the user, and/or data indicating resources visited or viewed by the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The contextual data of a digital component request 125-*a* can be related to, e.g., describe, the environment in which a selected digital component will be presented. The contextual data can include, for example, coarse location information indicating a general location of the client device 110 that sent the digital component request 125-*a*, data indicating a resource (e.g., website or native application content) or a native application with which the selected digital component will be presented, keywords or topics of the resource, a query submitted by the client device 110 to a search engine, a spoken language setting of the application 112 or client device 110, the number of digital component slots in which digital components will be presented with the resource, the types of digital component slots, and/or other appropriate contextual information.

The secure distribution system 120 can be configured to select and provide digital components in response to digital component requests 125-*a* received from client devices 110. The secure distribution system 120 be implemented using one or more server computers (or other appropriate computing devices), that may be distributed across multiple locations. In general, the secure distribution system 120 receives digital component requests 125-*a* from client devices 110, selects digital components based on data included in the digital component requests 125-*a*, and sends the selected digital components to the client devices 110. As described in more detail below, some functionality of the secure distribution system 120 can be implemented on the client devices 110 in some implementations.

As the secure distribution system 120 receives sensitive user data, the secure distribution system 120 can be operated and maintained by an independent trusted party, e.g., a party that is different from the users of the client devices, the parties that operate the SSPs 140 and DSPs 150, and the digital component providers 160. For example, the secure distribution system 120 can be operated by an industry group or a governmental group. In another example, the secure distribution system 120 can be operated by a content platform or another entity and code, e.g., non-customizable code, executed by the secure distribution system 120 can be audited by a trusted third party.

As described in more detail below, the secure distribution system 120 can select one or more digital components from a set of digital components stored in a digital component repository 130 and/or a set of digital components received from one or more content platforms, e.g., from an SSP 140. The digital component repository 130 stores digital components received from content platforms (e.g., from SSPs 140 and/or DSPs 150) and additional data (e.g., metadata) for each digital component.

The metadata for a digital component can include, for example, distribution criteria that defines the situations in which the digital component is eligible to be provided to a client device 110 in response to a digital component received from the client device 110 and/or a selection parameter that indicates an amount that will be provided to the publisher if the digital component is displayed with a resource of the publisher and/or interacted with by a user when presented. For example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, topics of interest, and/or other appropriate distribution criteria. The distribution criteria can also include negative criteria, e.g., criteria indicating situations in which the digital component is not eligible (e.g., with particular resources or in particular locations). Other data that can be used to select a digital component can also be stored in the digital component repository with a reference (e.g., a link or as metadata) to its digital component.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create (or otherwise publish) digital components that are presented in digital component slots of publisher's resources.

In this example, user data does not cross a trust boundary 107 that separates the client device 110, the secure distribution system 120, and the digital component repository from the SSP 140, DSP 150, and digital component providers 160. In this way, no entity other than the client device 110 and the secure distribution system 120 receives the user data that is included in a digital component request 125-*a*, at least in a non-encrypted form. This preserves user privacy and data security, especially when compared to techniques that employ third party cookies to send user data across the Internet.

To select a digital component, the secure distribution system 120 can execute secure workflows of multiple content platforms, e.g., of multiple DSPs 150. The secure workflow of each DSP 150 can include customized code that selects a candidate digital component based on the user data of the digital component request 125-*a*. In this way, candidate digital components can be selected based on user data and confidential content platform logic without providing the user data to the content platforms.

An example process for selecting and providing a digital component for presentation at a client device 110 is illustrated in stages A-I, which illustrate a flow of data between the components of the environment 100.

In stage A, the application 112 sends a digital component request 125-*a* to the secure distribution system 120. As described above, the application 112 can send a digital component request 125-*a* to request a digital component for presentation in a digital component slot of a resource being presented by the application 112. The digital component request 125-*a* can include user data and/or contextual data.

In stage B, the secure distribution system 120 sends a context-based digital component request 125-*b* to an SSP 140. The context-based digital component request 125-*b* can include the contextual data of the digital component request 125-*a* received from the application 112. However, the context-based digital component request 125-*b* does not include any of the user data. The secure distribution system 120 can temporarily store the user data while waiting for a response from the SSP 140. The server 120 can send the context-based digital component request 125-*b* to an SSP 140 for the publisher of the resource being, or that is about to be, presented by the application 112. The secure distribution system 120 can generate anew context-based digital component request 125-*b* that includes the contextual data or remove the user data from the digital component request 125-*a* and forward the digital component request 125-*a* without the user data to the SSP 140.

In stage C, the SSP 140 forwards the context-based digital component request 125-*b* to one or more DSPs 150. In stage D, each DSP 150 sends, to the SSP 140, one or more selection parameters for one or more digital components, e.g., digital components stored in the digital component repository 130. For example, the DSP 150 can select a digital component based on the contextual data of the context-based digital component request 125-*b* and determine a selection parameter for the digital component based on the contextual data. The DSP 150 can also provide a digital component and selection parameter for the digital component, e.g., a digital component that is not stored in the digital component repository 130. Each DSP 150 can send, to the SSP 140, one or more selection parameters with data indicating, for each selection parameter, the digital component to which the selection parameter applies. Each DSP 150 can also send, to the SSP 140, one or more digital components and data indicating, for each digital component, a selection parameter.

In stage E, the SSP 140 sends a digital component response 129 that includes the digital components and/or selection parameters to the secure distribution system 120. In some implementations, the SSP 140 can filter digital components and/or selection parameters prior to sending the digital components and/or selection parameters to the secure distribution system 120 in the response 129. For example, the SSP 140 can filter digital components and/or selection parameters based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In some implementations, stages B-E are optional stages to obtain additional digital components as candidates for presentation to the user in response to the digital component request 125-*a*. In such implementations, the secure distribution system 120 can select a digital component from those for which metadata is stored in the digital component repository 130.

In stage F, the secure distribution system 120 queries the digital component repository 130 for a set of digital components that are selected based on the user data of the digital component request 125-*a*. For example, the server 120 can submit a query that defines, as conditions of the query, the user data of the digital component request 125-*a*. In some implementations, the query can also include context-based conditions. For example, a query can request retrieval of digital components that include, as distribution criteria, a particular user group and/or a particular geographic location. Although shown after stages B-E, the secure distribution system 120 can query the digital component repository 130 in parallel with these stages to reduce the latency in selecting and providing a digital component to the application 112.

In stage G, the server 120 receives a set of one or more user-based digital components (or data identifying the digital components) from the digital component repository 130 and a selection parameter for each digital component. This set of digital components can include those having distribution criteria that matches the conditions of the query.

In stage H, the secure distribution system 120 selects a digital component to provide to the application 112 for presentation in the digital component slot. The secure distribution system 120 can select a digital component from a set of candidate digital components that includes the digital components received from the SSP 140 and the digital components received from the digital component repository 130. The secure distribution system 120 can select the digital components from the two sets based on the selection parameter for each digital component in the two sets. For example, the secure distribution system 120 can select the digital component having the highest selection parameter. In another example, the secure distribution system 120 can select a digital component using, for each candidate digital component, a score that is based on a combination of the selection parameter for the candidate digital component and a predicted performance (e.g., predicted user interaction rate) for the candidate digital component.

As described in more detail below, the secure distribution system 120 can execute secure workflows of content platforms to select candidate digital components for inclusion in the set of candidate digital components from which the secure distribution system 120 selects a digital component to provide to the client device 110. The secure workflows can be executed in addition to querying the digital component repository or in place of querying the digital component repository 130. For example, a secure workflow of a content platform can be used to select a digital component from multiple digital components obtained from the digital component repository 130 and/or to determine the selection parameter for a digital component obtained from the digital component repository 130.

In stage I, the secure distribution system 120 provides the selected digital component to the application 112. The application 112 can then present the digital component with the resource being presented by the application 112.

Figure 2:
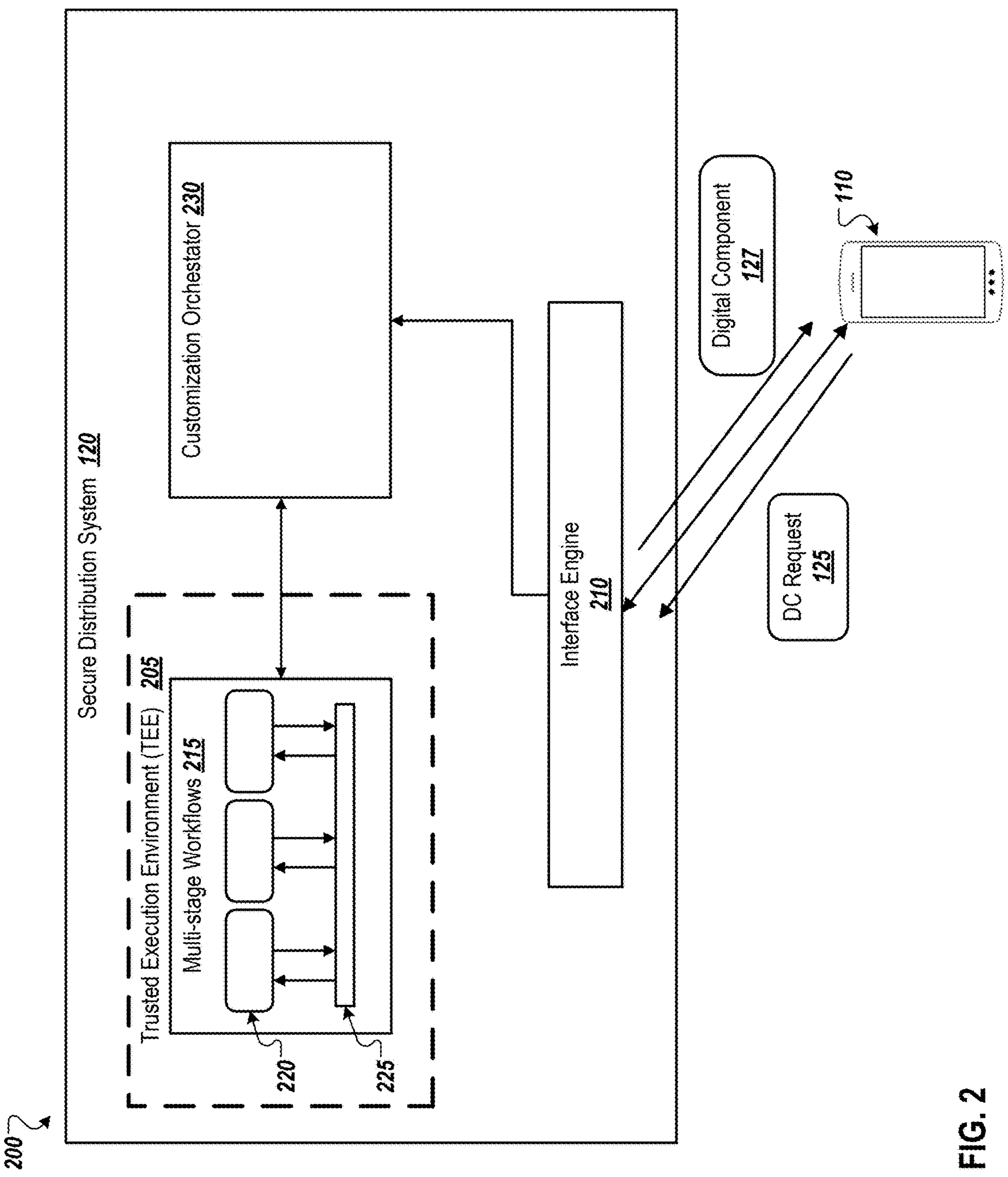
FIG. 2 shows example components of the secure distribution system of FIG. 1.

FIG. 2 shows example components of the secure distribution system 120 of FIG. 1. In general, the secure distribution system 120 can receive digital component requests 125-*a* from client devices 110, securely execute multi-stage workflows to select digital components and/or to generate selection parameters for digital components, and provide digital components 127 to client devices 110. The secure distribution system 120 can include an interface engine 210, a TEE 205 in which multi-stage workflows 215 are executed, and a customization orchestrator 230. Each workflow 215 can be executed in a common TEE or each workflow 215 can be executed in its own dedicated TEE. For example, the secure distribution system 120 can include a respective TEE 205 for each workflow 215 and the TEE 205 for each workflow 215 and differ from, and be isolated from, the TEE 205 of each other workflow 215. In some implementations, each workflow 215 is executed in a VM, which can be initiated and executed by a TEE 205. In some implementations, individual worklets or customization modules 220 are executed in VMs, which can be initiated and executed by a TEE 205.

The interface engine 210 is configured to receive digital component requests 125, and can provide digital components 127 and/or references to digital components 127 in response to the digital component requests 125. A reference to a digital component can include an identifier for the digital component or a resource locator, e.g., Uniform Resource Locators (URLs) or Universal Resource Identifier (URI), that enables client devices 110 to download the referenced digital components 127 from servers connected to the network 105.

The interface engine 210 can include an application programming interface (API) that is configured to accept data (digital component requests 125) provided to the secure distribution system 120 and/or to provide data (e.g., digital components 127) to other components of the environment 100 of FIG. 1. Other types of interfaces for receiving and sending data can also be used.

In general, when a digital component request 125 is received, the interface engine 210 can provide the digital component request 125 or data extracted from the digital component request 125 to the customization orchestrator 230. Similarly, when a digital component 127 is selected using the multi-stage workflows 230 of content platforms, the customization orchestrator 230 can provide the selected digital component or the reference to the digital component 127 to the interface engine 210 to provide to the client device 210.

The customization orchestrator 215, which can be implemented in software and/or hardware of the secure distribution system 120, is configured to manage the execution of secure multi-stage workflows 215 of content platforms to obtain a set of candidate digital components and/or to manage the execution of secure workflows for selecting a digital component from the set of candidate digital components. Although shown outside of the TEE 205, the customization orchestrator 230 can execute inside the TEE 205 in some implementations.

As described in more detail below, each workflow 215 can include customization modules 220 that are coupled to a common data bus 225 that enables the customization modules 220 to transfer data between each other. The combination of the customization modules 220 and the common data bus 225 for a multi-stage workflow 215 can be referred to as a workflow unit. The customization orchestrator 215 is configured to manage the transfer of data between customization modules 220 using the common data bus 225 and to manage the execution of worklets of the customization modules 220.

A digital component selection process of a content platform, e.g., of a DSP 150, can have multiple stages defined by the multi-stage workflow 215. In some implementations, the overall sequence of stages can be rigid such that there are no customizations by content platforms. In some implementations, the content platforms can customize the stages to be performed in different orders, or to have some performed concurrently.

The processes performed in some stages can be customized by the content platforms using the customization modules 220. For example, the digital component selection process can have a stage in which a digital component request 125 is processed to extract data from the digital component request 125. This stage may be a default stage in which default code, e.g., standard worklets, that cannot be customized by content platforms is used by the customization orchestrator 215.

A later stage can include selecting candidate digital components and generating corresponding selection parameters. At this stage, the customization orchestrator 215 can execute customized worklets of a customization module 220 provided by the content platforms to select the candidate digital components and generate the corresponding selection parameters.

As the logic provided by the content platforms is typically considered confidential, the customization modules 220 can be securely stored by the secure distribution system 120 and can be executed in isolated environments, such as the TEE 205. Other standard or default code can be executed outside of the isolated environment. In this way, this other code can be executed faster and more efficiently than if the code was executed in the TEE 205, which can involve cryptography and other security measures.

The customization orchestrator 230 can execute multi-stage workflows 215 of multiple content platforms, e.g., DSPs 150, to obtain a set of candidate digital components. Each multi-stage workflow 215 can output one or more candidate digital components and, for each candidate digital component, a corresponding selection parameter. These candidate digital components and their selection parameters can be determined based on user data since they are executed in a secure environment.

The customization orchestrator 230 can also receive candidate digital components from content platforms. For example, the customization orchestrator 230 can receive candidate digital components that are selected based on contextual data, e.g., using stages B through E of FIG. 1, as described above. The set of candidate digital components from which a digital component is selected for the client device 110 can include the candidate digital components output by the secure workflows 215 and the candidate digital components received from the content platforms.

The secure distribution system 120 can then select a digital component from the candidate digital component in various ways. For example, the TEE 205 can select a digital component based on the selection values for the candidate digital components. In another example, the customization orchestrator can execute a customization module 220 or workflow 215 of the SSP 140 corresponding to the resource for which a digital component is being selected to select the digital component. In this example, the custom logic of the SSP 140 can be executed in the secure environment provided by the secure distribution system 120 to select the digital component.

As described in more detail below, secure workflows 215 and/or customization modules 220 of workflows 215 can be executed by the secure distribution system 120 and/or the client devices 110. For example, the workflow 215 or customization module(s) 220 used to select the digital component from the candidate digital components can be executed by either the secure distribution system 120 or the client device 110 depending on the implementation. This preserves user privacy and observers from outside the trust boundary 107 from learning about the users.

For example, without using the secure distribution system 120 or TEE to select a digital component, the digital component would be exposed outside of the trust boundary 107. To illustrate, a malicious DSP 150 may setup a repository in the trusted boundary 107 that just has digital components that are eligible for distribution to users that like dogs. If even a single encrypted digital component is returned outside the trust boundary 107 and nothing about the digital component can be gleaned from the data itself, observers from outside the trust boundary 107 may be able to learn that the user likes dogs because a digital component was returned from a repository that only includes digital components for users who like dogs. Using the TEE 205 and/or client device 110 to perform the selection prevents such learning about the user's interests.

Figure 3:
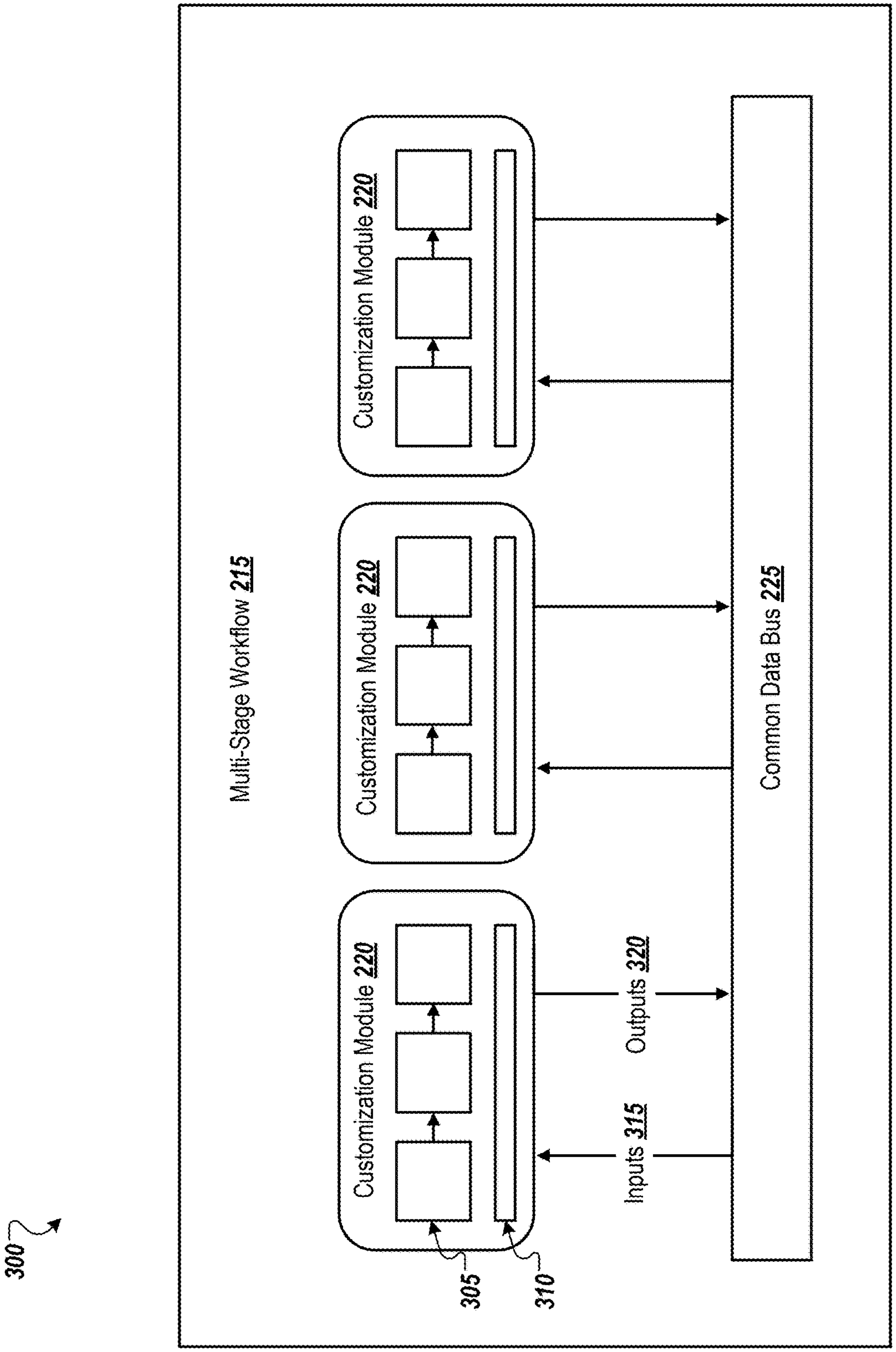
FIG. 3 shows an example multi-stage workflow.

FIG. 3 shows an example multi-stage workflow 215. In general, the multi-stage workflow 215 includes multiple customization modules 220 communicatively coupled to each other by a common data bus 225. The common data bus 225 can be implemented in hardware and/or software. For example, a software data bus can include one or more data communication channels that facilitate communication between software modules, e.g., the customization modules 220. The customization modules 220 are configured to read data from each of the data channels and write back data to the data channels of the common data bus 225, as described in further detail below with reference to FIGS. 4 and 5.

In some implementations, the common data bus 225 can include multiple channels for different types of data. For example, the common data bus 225 can include a user data channel for transferring user data between customization modules 220. The customization orchestrator 230 can extract user data from a digital component request 225-*a* and send the user data to one or more of the customization modules 220 via the user data channel. The customization modules 220 can also transfer user data between one another using the user data channel. For example, a customization module 220 can select a candidate digital component based on user data and provide the user data to another customization module 220 that is configured to generate a selection parameter for the candidate digital component.

The common data bus 225 can include a candidate data channel for transferring data about candidate digital components between the customization modules 220. Continuing the previous example, the customization module 220 can provide data identifying the candidate digital component to the other customization module 220 that is configured to generate the selection parameter. In another example, the customization orchestrator 230 can receive the response 129 that includes candidate digital components selected based on non-sensitive data, e.g., based on contextual data. The customization orchestrator 230 can provide data identifying these candidate digital components to customization modules 230 via the candidate data channel.

The common data bus 225 can include a contextual data channel for transferring contextual data between the customization modules 220. For example, the customization orchestrator 230 can extract contextual data from the digital component request 125-*a* and send the contextual data to one or more customization modules 220 via the contextual data channel. Similarly, a customization module 220 can send contextual data to another customization module 220 via the contextual data channel.

The common data bus 225 can include an auxiliary data channel for transferring auxiliary data between the customization modules 220. The auxiliary data can include data obtained from a content platform for the workflow 215 through an auxiliary API. In some implementations, the auxiliary data is immutable.

In general, the candidate data channel, the contextual data channel, and the auxiliary data bus can include data specific to the content platform for which the workflow 215 is executed. Thus, the common data bus of each workflow 215 may not be connected to other workflows of other content platforms. For example, each workflow 215 can be executed in a separate isolated environment, e.g., a separate TEE 205.

Using multiple data channels reduces the amount of processing performed by components of the secure distribution system 120. For example, some components of the secure distribution system 120 can be configured to process only some types of data. By using different channels for different types of data, these components do not waste resources processing other types of data. For example, as described below with reference to FIG. 4, the secure distribution system 120 can include a policy engine 405 that can evaluate user data before providing the user data to customization modules 220 and/or enabling the data from a customization module 220 to be output to the common data bus 225. By including the user data on a dedicated user data channel, the policy engine 405 is able to enforce the correct usage of user data while only processing the data on the user data channel.

Each customization module 220 can be configured to perform one or more tasks of the workflow 215, e.g., the one or more tasks of a given stage of the workflow 215. For example, one customization module 220 be configured to select one or more candidate digital components based on user data, contextual data, and/or other data, while another customization module 220 can be configured to generate a selection parameter for each candidate digital component. Other customization modules 220 can be configured to filter candidate digital components based on eligibility criteria, e.g., resource availability for fulfilling selection parameters, content platform enabling/disabling the candidate digital component, publisher requirements, etc. Another customization module 220 can be configured to expand a candidate digital component into multiple variations of the same candidate digital component with different visual characteristics (e.g., different layouts or content), and then to select from these variations.

Each customization module 220 can include one or more worklets 305 and a local data bus 310 that communicatively couples the worklets 305 of a customization module 220. The worklets can communicate data between each other via the local data bus 310. The local data bus 310 be implemented in a similar manner as the common data bus 225.

Each worklet 305 can include code for performing a sub-task of the customization module 220. For example, the task of a customization module 220 can be to select candidate digital components for which their distribution criteria are satisfied by the data of the digital component request 125-*a*. A worklet 305 of this customization module 220 can include code for comparing keywords of contextual data of the digital component request 125-*a* to keywords of the distribution criteria of a set of digital components to identify candidate digital components having contextual distribution criteria that are satisfied by the contextual data of the digital component request. Another worklet 305 of this customization module 220 can be configured to compare user data of the digital component request 125-*a* to user parameters of the distribution criteria of the digital components to identify candidate digital components having user-based distribution criteria that are satisfied by the user data of the digital component request 125-*a*.

A customization module 220 can include one or more standard worklets and/or one or more customized worklets. A standard worklet is a worklet that is provided as part of the secure distribution system 120 and that include code for performing a task, e.g., default code for performing the task. For example, a standard worklet may not be customizable by a content platform for a worklet, but may be selected for inclusion in a customization module 220 for the workflow 215 of the content platform.

A customized worklet is a worklet that can be customized by a content platform. A customized worklet can be include all customized code provided by a content platform. For example, a customized worklet can include code defining a set of rules for selecting a candidate digital component or code defining a trained machine learning model that is trained to select a candidate digital component or to generate a selection parameter for a candidate digital component.

In another example, the secure distribution system 220 can make customizable worklets available to content platforms. These customizable worklets can include some standard code and portions that can be customized by the content platforms to generate customized worklets.

A content platform can generate customization modules 220 by creating and/or selecting worklets 305 for the customization modules 220 and arranging the worklets 205 in a sequence. A sequence of worklets 305 can include worklets 305 that are executed concurrently, as described below with reference to FIG. 4. The content platform can also define the data that is input to and output from each worklet 205 and/or the types of data that are exchanged between worklets 305 over the local data bus 310.

The content platform can also arrange the customization modules 220 in a sequence, which can also include concurrently executed customization modules 220 and/or concurrent sequences of customization modules 220, as described below with reference to FIG. 7. The content platform can also define the types of input data 315 and output data 320 for each customization module 220.

The customization orchestrator 230 is configured to execute the customization modules 220 and the worklets 305 of the customization modules 220 based on the arrangement of the worklets 305 and the customization modules 220 defined by the content platform. The customization orchestrator 230 also controls the input data 315 provided to each customization module 220 and the output data output by each customization module 220 to the common data bus 225. For example, if a customization module 220 consumes a particular type of data, the customization orchestrator 230 can provide that data to the customization module 220 via the common data bus 225.

In some implementations, the customization orchestrator 215 can convert the input data 315 for responding to a customization module 220 into a set of defined inputs based on a provided definition provided by the corresponding customization module 220. For example, certain customization modules 220 may have limited access to data associated with a user and the customization orchestrator 215 can ensure that only eligible user data is provided to the customization modules 220.

In some implementations, as described below, each customization module 220 can include an operation orchestrator 403 (FIG. 4) that runs and manages the operations that run within the worklet 305. Similar to the customization orchestrator 215, an operation orchestrator can manage the distribution of data to and from worklets 305 of a customization module 220 via the local data bus 225.

After executing the sequence of worklets 305, the customization module 220 can generate the output data 320. The customization orchestrator 215 can then send the output data 320 to another customization module 220 using the common data bus 225. In some examples, similarly to defining the inputs 315, the customization orchestrator 215 can convert the output data 320 corresponding to a customization module 220 into a defined set of outputs based on a definition of the corresponding customization module 220.

In this manner, the customization orchestrator 215 can execute each of the customization modules 220 to select one or more candidate digital components, expand candidate digital components into multiple variations, filter candidate digital components based on eligibility criteria, and/or generate a selection parameter for each candidate digital component. A final customization module 220 in the workflow 215 can generate this data and provide the data to the customization orchestrator 215.

Figure 4:
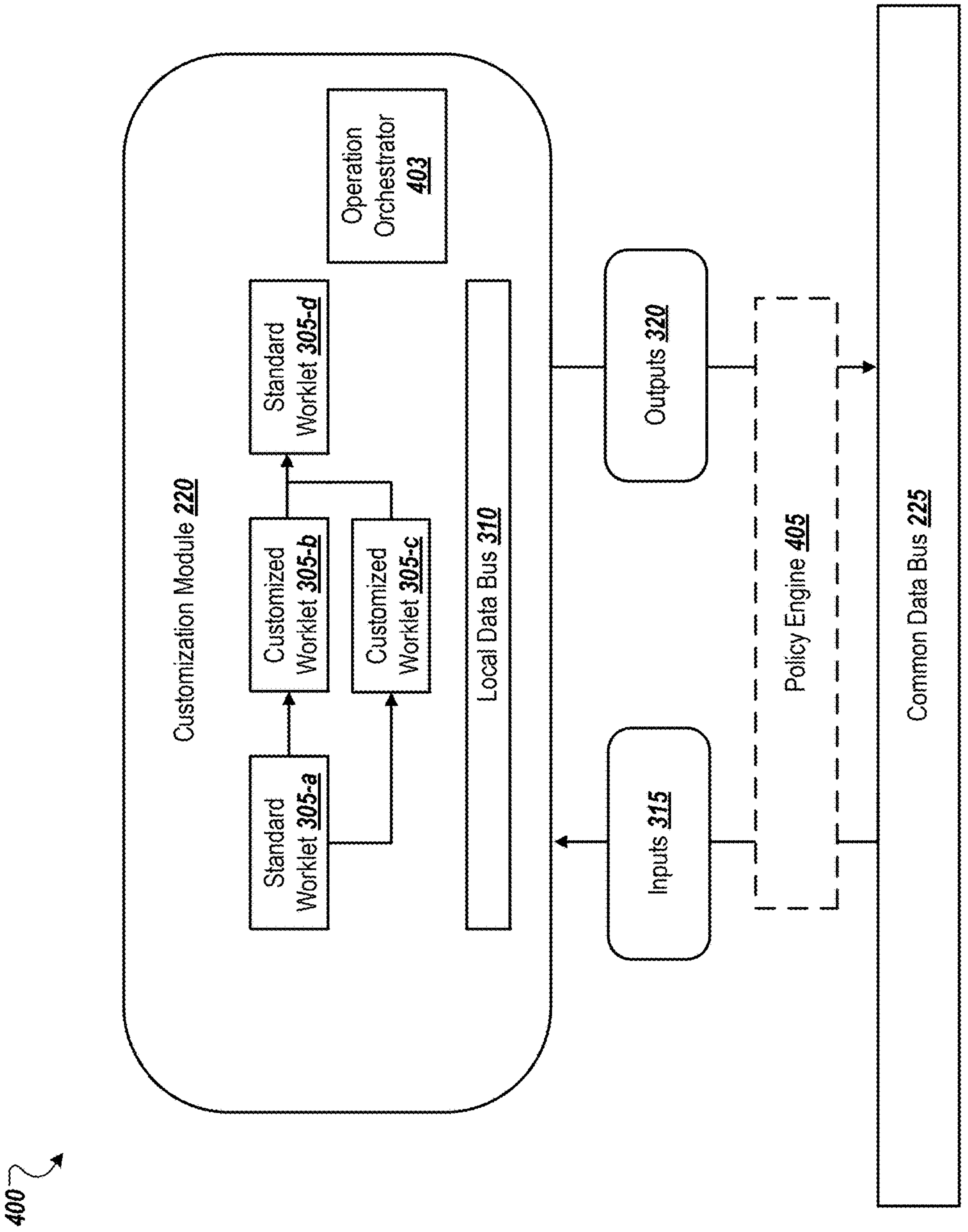
FIG. 4 shows an example customization module coupled to a common data bus.

FIG. 4 shows an example customization module 220 coupled to a common data bus 225. This example customization module 220 includes two standard worklets 305-*a* and 305-*d* and two customized worklets 305-*b* and 305-*c* that are executed concurrently. Although not shown, each worklet 305*a*-305*d* is communicatively coupled to the local data bus 310.

The operation orchestrator 403 of the customization module 220 can execute each of the worklets 305*a*-305-*d* in the order defined by the customization module 220. For example, the operation orchestrator 403 can provide a defined set of inputs from the input data 315 to the standard worklet 305-*a*. The operation orchestrator 403 can execute the standard worklet 305-*a* and use the local data bus 310 to provide the outputs of the standard worklet 305-*a* to the customized worklets 305-*b* and 305-*c*.

The operation orchestrator 403 can execute the customized worklet 305-*b* and the customized worklet 305-*c* concurrently (e.g., in parallel), such that each worklet 305-*b* and 305-*c* processes the outputs of the standard worklet 305-*a* as inputs and generates corresponding outputs associated with the operation of the customized worklet. The operation orchestrator 405 can then execute the standard worklet 305-*d* by providing the outputs of both the customized worklet 305-*b* and the customized worklet 305-*c* as inputs to the standard worklet 305-*d*, and the operation orchestrator 403 can provide the outputs of the standard worklet 305-*d* to the local data bus 310. The customization orchestrator can then convert the outputs of the standard worklet 305-*d* to a defined set of output data 320. The customization orchestrator 403 can provide the output data 320 to the common data bus 225.

In some examples, the customization module 220 is coupled to a policy engine 405. The policy engine 405 can determine whether the input data 315, the output data 320, or both comply with a set of data policies.

Based on whether the inputs 315, the outputs 320, or both comply with the set of data policies, the policy engine 405 can determine whether to provide the input data 315 to the customization module 220, whether to send the output data 320 to the common data bus 225, or both.

The set of data policies can be defined by the content platform and/or an entity that operates the secure distribution system 120. For example, the inputs 315 may violate a data policy associated with user privacy, and the policy engine 405 can determine that the inputs 315 violate the data policy and to refrain from providing the inputs 315 to the customization module 220.

Figure 5:
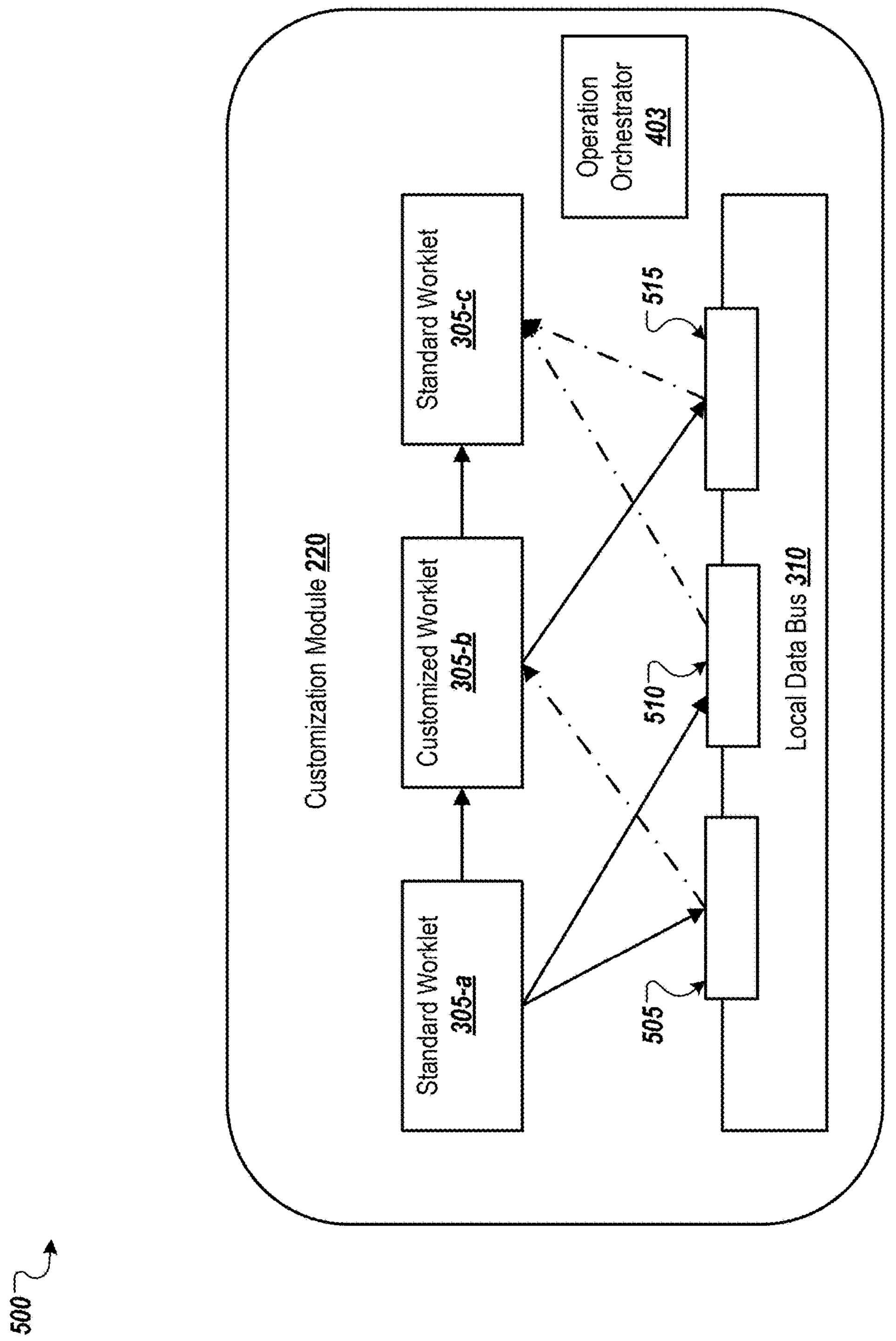
FIG. 5 shows an example data flow of a customization module.

FIG. 5 shows an example data flow of a customization module 220. In general, the operation orchestrator 403 can execute each worklet 305 of the sequence of worklets 305 of the customization module 220 using the local data bus 310. The operation orchestrator 403 can read data from the local data bus 310 and write data to the local data bus 310 to execute each worklet 305.

In particular, the operation orchestrator 403 can execute standard worklets 305-*a* and customized worklets 305-*b* by providing inputs to each of the worklets. The inputs can be data read from a certain data channel of the local data bus 310. The local data bus 310 can be an internal data bus for the operations of the customization module 220.

Additionally, the operation orchestrator 403 can provide the outputs of the executed standard worklets 305-*a* and the executed customized worklets 305-*b* to a subsequent worklet 305 of the sequence of worklets 305 using the local data bus 310. The operation orchestrator 403 can write data associated with the outputs to certain data channel of the local data bus 310. The operations of the operation orchestrator 403 to write data local data bus 310 can, in some examples, persist across customization modules 220 based on the defined set of outputs of the customization modules 220.

For example, the operation orchestrator 403 can execute the standard worklet 305-*a* as the first worklet of the sequence of worklets. For example, the operation orchestrator 403 can provide data associated with the defined set of inputs of the customization module 220 to the standard worklet 305-*a*. The standard worklet 305-*a* can process the data to generate outputs. The operation orchestrator 403 can provide the outputs of the standard worklet 305-*a* to the local data bus 310. In particular, the operation orchestrator can write the data associated with the outputs to the data channel 505 and the data channel 510 of the local data bus 310. The data channel 505 can be associated with the defined set of outputs for the customization module 220, and the data associated with the data channel 505 can persist among the customization modules 220. The data channel 510 can be associated with arbitrary data provided by the content provider, and the arbitrary data may not persist across customization modules 220.

The operation orchestrator 403 can then execute the customized worklet 305-*b* by reading the data from the data channel 505 and providing the data from the data channel 505 as inputs to the customized worklet 305-*b*. The customized worklet 305-*b* can process the inputs to generate outputs. The operation orchestrator 403 can write the outputs to the data channel 515, and the data channel 515 can be associated with the defined set of outputs for the customization module 220.

The operation orchestrator 403 can read the data of the data channel 510 (e.g., the arbitrary data from the content provider) and the data of the data channel 515 (e.g., the outputs of the customized worklet 305-*b*) and provide the data as inputs to the standard worklet 305-*c*. In some examples, the standard worklet 305-*c* can process the inputs to generate outputs for the customization module 220.

Figure 6:
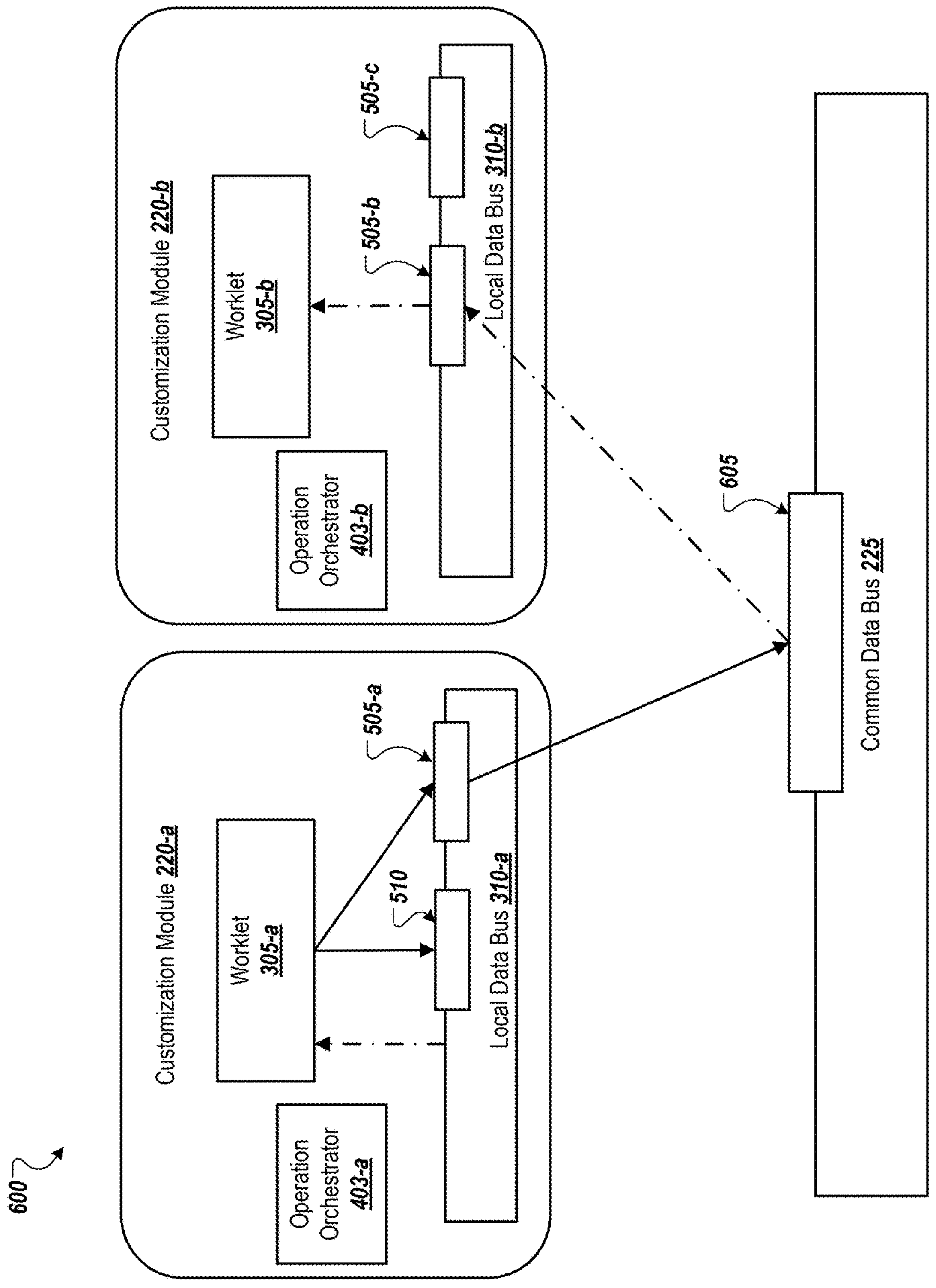
FIG. 6 shows an example data flow between customization modules of a multi-stage workflow.

FIG. 6 shows an example data flow between customization modules 220 of a multi-stage workflow 215. In general, the customization orchestrator 230 can execute customization modules 220 of the secure workflow 215 and exchange data between the customization modules 220 using the common data bus 225. The customization orchestrator 230 can read data from a customization module 220 and write data to the common data bus 225 for use in executing the subsequent customization module 220.

In particular, the customization orchestrator 230 can execute each of the customization modules 220 by providing inputs to each of the customization modules 220 in the secure workflow 215. The inputs can include data from the outputs of a previous customization module 220 in the secure workflow 215 and/or other input data defined for the customization module 220. The customization orchestrator 230 can read data read from a certain data channel of the common data bus 225. The operations of the customization orchestrator 230 to write data, in some examples, persist across customization modules 220 based on the defined set of outputs of the customization modules 220.

For example, the customization orchestrator 230 can provide a set of inputs to the customization module 220-*a*. The operation orchestrator 403-*a* of the customization module 220-*a* can execute a worklet 305-*a* of the customization module 220-*a* by reading data from the local data bus 310-*a* and providing the data to the worklet 305-*a* as inputs. The worklet 305-*a* can process the inputs and generate outputs. The operation orchestrator 403-*a* of the customization module 220-*a* can write the outputs to a data channel 510 of the local data bus 310-*a* and a data channel 505-*a* of the local data bus 310-*a*. The data channel 510 can be associated with arbitrary data from the content provider, and the data channel 505-*a* can be associated with the defined set of outputs for the customization module 220-*a*. Other types of data channels can also be used, as described herein.

The customization orchestrator 230 can then write the data from the data channel 505-*a* to a data channel 605 of the local data bus. The data channel 605 can be a user data channel, a candidate data channel, a contextual data channel, or an auxiliary data channel. In some examples, the customization orchestrator 230 can convert the data from the data channel 505-*a* to a set of output data based on a definition corresponding to the customization module 220-*a*.

The customization orchestrator 230 can read the data from the data channel 605 and provide the data as inputs to the customization module 220-*b*. In some examples, the customization orchestrator 230 can convert the data from the data channel 605 to a set of inputs based on a definition corresponding to the customization module 220-*b*.

The customization orchestrator 230 can write the data to a data channel 505-*b* of the local data bus 310-*b*, and the operation orchestrator 403-*b* of the customization module 220-*b* can provide the data to the worklet 305-*b* as inputs.

The data channel 505-*b* and the data channel 505-*c* can both be associated with the defined set of outputs for the customization module 220-*b*.

Figure 7:
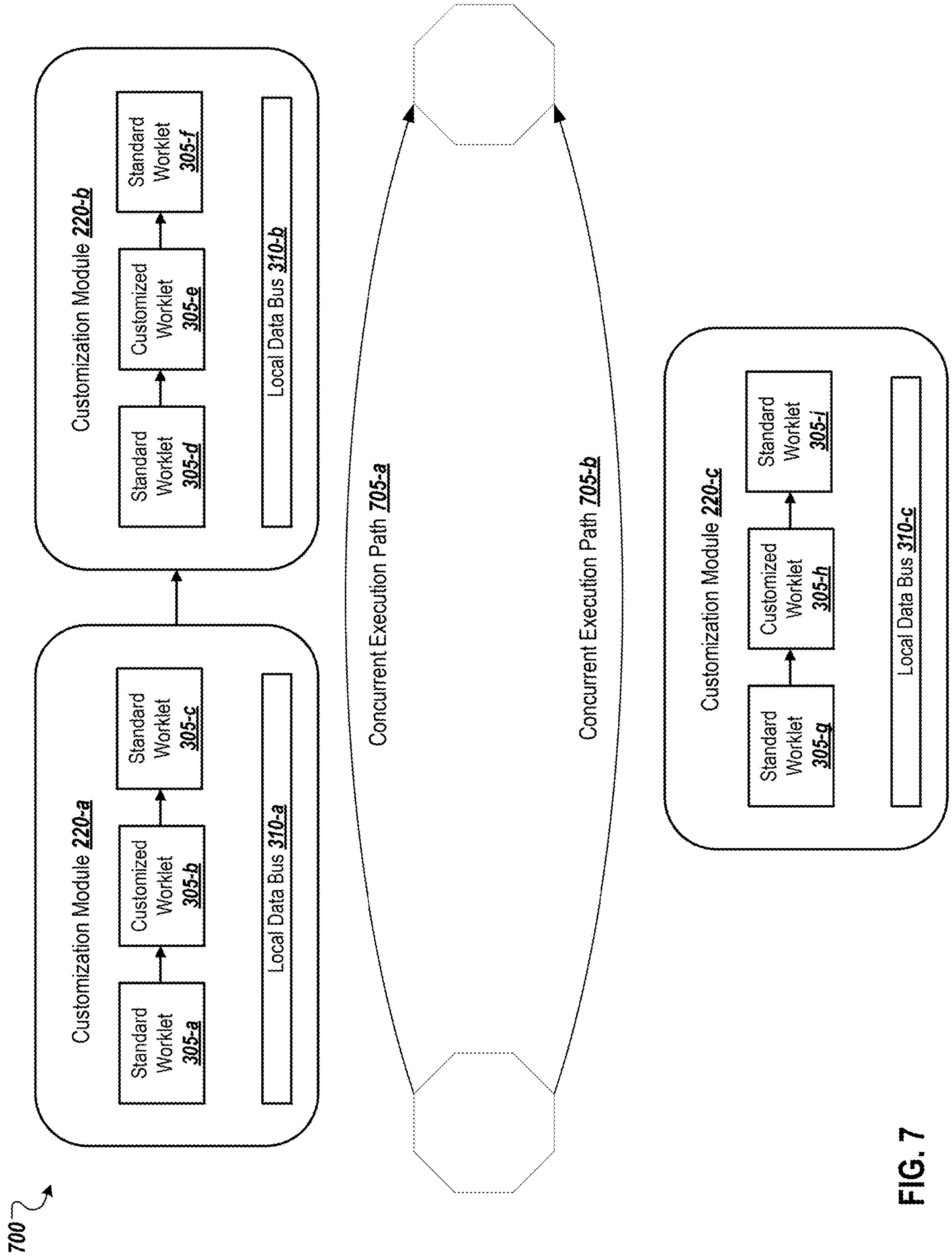
FIG. 7 shows an example of concurrent execution of customization modules by a secure distribution system.

FIG. 7 shows an example of concurrent execution of customization modules 220 by a secure distribution system 120. In general, the customization orchestrator 230 can execute multiple customization modules 220 of a secure workflow 215 concurrently based on multiple concurrent execution paths 705, e.g., execution paths 705-*a* and 705-*b*.

The customization orchestrator 230 can execute multiple concurrent execution paths 705, and each concurrent execution path 705 can include a sequence of one or more customization modules 220. For example, the customization orchestrator 230 can divide an execution path into two concurrent execution paths 705. The customization orchestrator 230 can simultaneously execute customization modules 220 of a first concurrent execution path 705-*a* and customization modules 220 of a second concurrent execution path 705-*b*.

The customization orchestrator 230 can execute the customization module 220-*a* and, subsequently, customization module 220-*b*, corresponding to the concurrent execution path 705-*a*, while executing customization module 220-*c* corresponding to the concurrent execution path 705-*b*. The customization orchestrator 230 can then merge the data output by the customization modules 220 of the concurrent execution paths 705-*a* and 705-*b* after the respective executions of the corresponding customization modules 220 using the common data bus 225.

Figure 8:
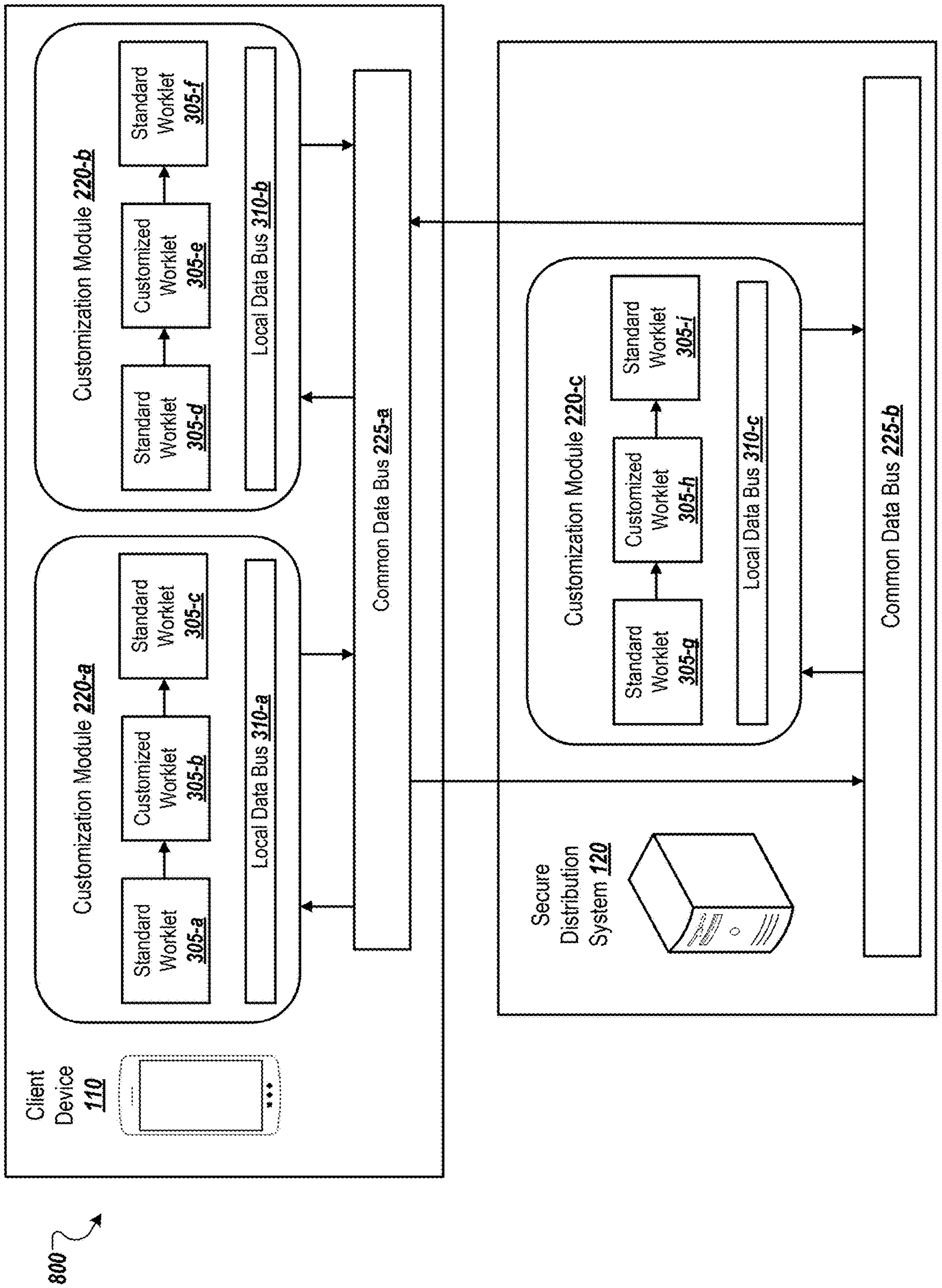
FIG. 8 shows an example distribution of customization modules between a secure distribution system and a client device.

FIG. 8 shows an example distribution of customization modules 220 between a secure distribution system and a client device 110. In this example some customization modules 220 of a secure workflow 215 are executed on the client device 110 while other customization modules 220 of the workflow 215 are executed on the secure distribution system 120.

The customization orchestrator 230 can execute one or more customization modules 220 on a client device 110, and the customization orchestrator 230 can execute one or more customization modules 220 on the secure distribution system 120 using corresponding common data buses 225. The customization orchestrator 230 can exchange data in the form of inputs and outputs from each of the common data buses 225 on the client device 110 and the secure distribution system 120.

For example, the client device 110 can be associated with a first common data bus 225-*a*, and the client device 110 can include a first customization module 220-*a* and a second customization module 220-*b*. The customization orchestrator 230 can execute the customization module 220-*a* and the customization module 220-*b* using each respective operation orchestrator of each customization module 220 to execute respective worklets 305 of each customization module 220 using respective local data buses 310. The customization orchestrator 230 can provide inputs and outputs to the customization modules 220 using the common data bus 225-*a*, where the inputs and the outputs may be based on data from the common data bus 225-*b* of the server 120. In particular, the customization orchestrator 230 can execute the customization module 220-*c* using an operation orchestrator 403 to execute the worklets 305 using the local data bus 310-*c*. The customization orchestrator 230 can provide inputs to the customization module 220-*c* from the common data bus 225-*c*, where the inputs may be associated with data from the common data bus 225-*a* of the client device 110.

Figure 9:
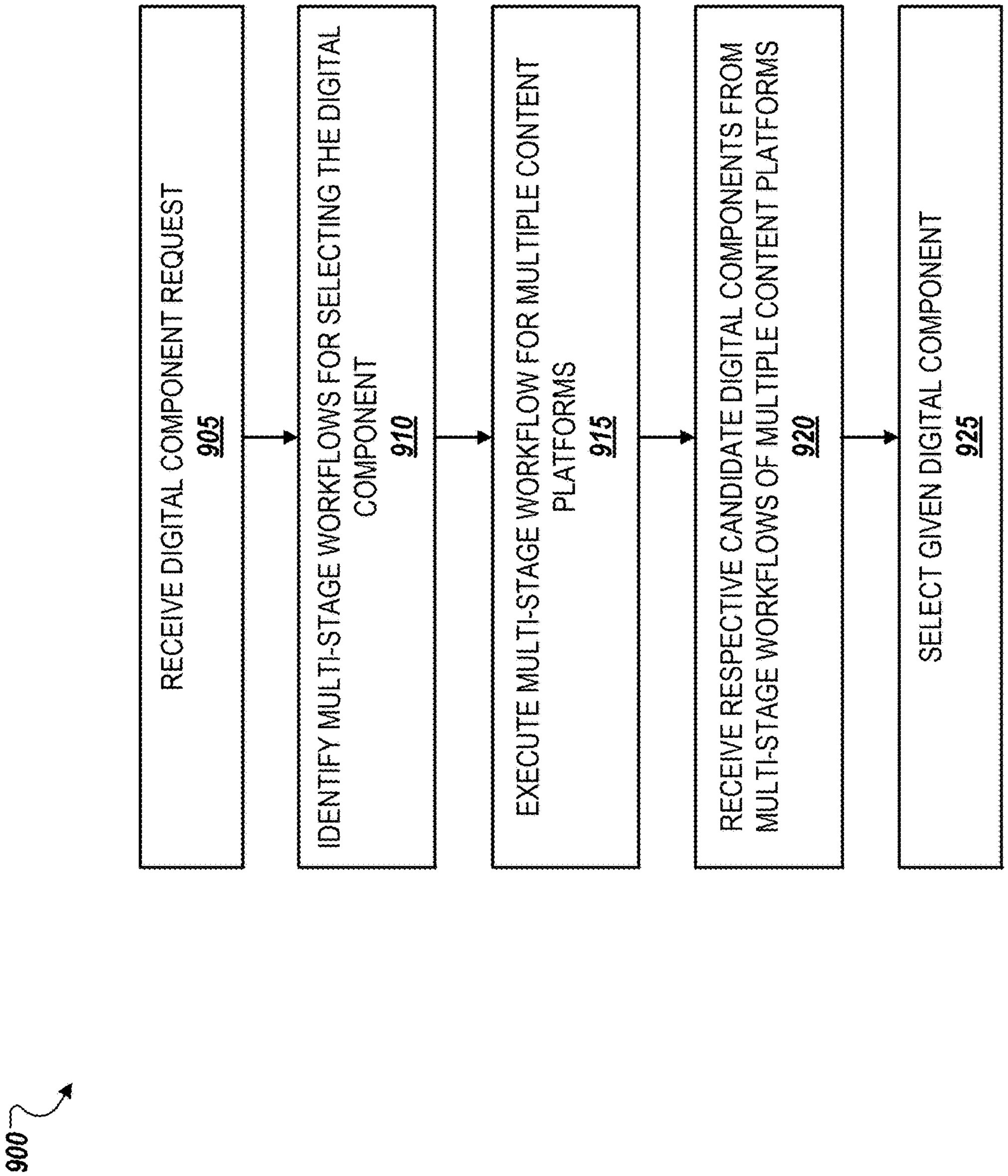
FIG. 9 is a flow diagram of an example process for executing secure workflows for selecting digital components.

FIG. 9 is a flow diagram of an example process 900 for executing secure workflows for content selection. For convenience, the process 900 will be described as being performed by a system for executing secure workflows for content selection, e.g., the secure distribution system 120 of FIGS. 1 and 2, appropriately programmed to perform the process. Operations of the process 900 can also be implemented as instructions stored on one or more computer readable media which may be non-transitory, and execution of the instructions by one or more data processing apparatus can cause the one or more data processing apparatus to perform the operations of the process 900. One or more other components described herein can perform operations of the process 900.

The system can receive a digital component request (905). The system can be a secure distribution system, and the system can receive the digital component request from a client device. The digital component request includes a set of data. The set of data can include user data and/or contextual data, as described herein.

The system can identify multi-stage workflows for selecting a digital component to provide to the client device in response to the digital component request (910). The system can identify multi-stage workflows defined by one or more content platforms, as described in further detail below with reference to FIG. 10. Each workflow can be configured to select one or more candidate digital components that are added to a set of candidate digital components from which a digital component is selected for presentation at the client device in response to the digital component request.

The system can execute the multistage workflow for multiple content platforms (915). The system can execute each multistage workflow by executing a sequence of customization modules, as described herein.

The system can receive the respective candidate digital components from the multi-stage workflows of the multiple content platforms (920). The system can include the candidate digital components from each workflow in the set of candidate digital components from which the digital component is selected for presentation at the client device in response to the digital component request.

The system can select a given digital component (925). In particular, the system can select the given digital component from the candidate digital components based on selection parameters for the digital components. For example, the system can select the digital component having the selection parameter with the highest value. The system can cause the client device to present the given digital component, e.g., by providing the digital component to the client device.

Figure 10:
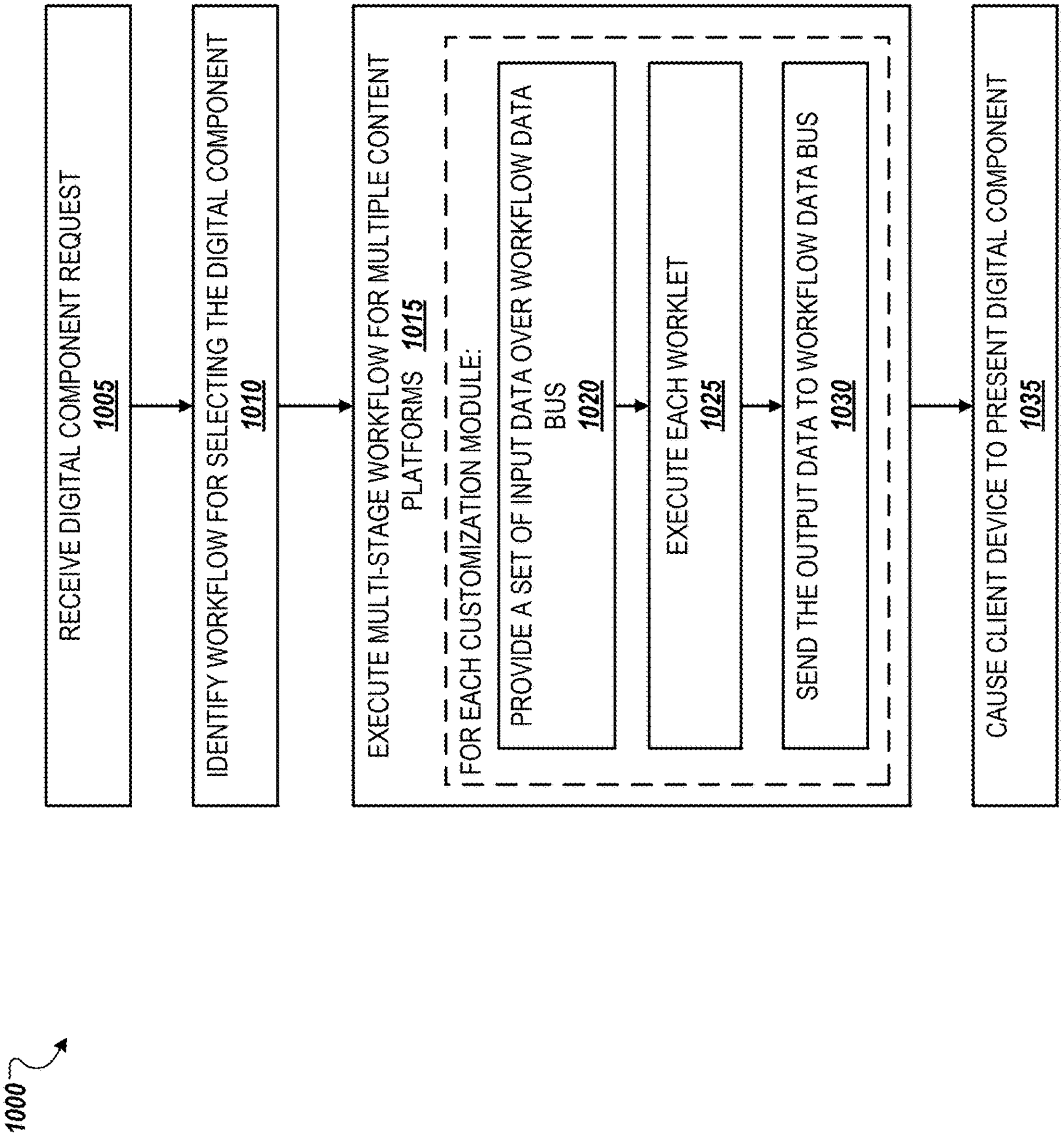
FIG. 10 is a flow diagram of the example process for executing secure workflows for selecting digital components.

FIG. 10 is a flow diagram of the example process for executing secure workflows for selecting digital components. For convenience, the process 1000 will be described as being performed by a system for executing secure workflows for content selection, e.g., the secure distribution system 120 of FIGS. 1 and 2, appropriately programmed to perform the process. Operations of the process 1000 can also be implemented as instructions stored on one or more computer readable media which may be non-transitory, and execution of the instructions by one or more data processing apparatus can cause the one or more data processing apparatus to perform the operations of the process 1000. One or more other components described herein can perform operations of the process 1000.

The system can receive a digital component request (1005). The system can be a secure distribution system, and the system can receive the digital component request from a client device. The digital component request includes a set of data, e.g. user data and/or contextual data.

The system can identify multi-stage workflows for selecting the digital component (1010). The system can use a customization orchestrator to identify each multi-stage workflow for selecting the digital component from a set of candidate digital components associated with a content platform of multiple content platforms. In particular, the multi-stage workflow includes a sequence of customization modules communicatively coupled to each other by a common data bus. Each customization module can include a set of worklets. The worklets can be customized worklets provided by the content platform or standard worklets used in customization worklets of multiple content platforms.

In some examples, some of the customization modules (e.g., one or more customization modules) are located in a trusted execution environment on the secure distribution system, and some customization modules are located on the client device.

The system can execute multi-stage workflow for each content platform of the one or more content platforms (1015). The system can execute each customization module of each multi-stage platform to select the digital component.

In particular, for each customization module, the system can use the customization orchestrator to provide a set of input data over to the customization module over the common data bus (1020). The customization orchestrator can transform the set of input data into a defined set of inputs associated with the customization module.

In some examples, the system includes a policy engine, and the policy engine determines whether the output data adheres to a set of data policies. The policy engine determines whether to provide the set of input data to the customization module based on whether the set of input data adheres to the set of data policies.

The system can execute each worklet of the customization module (1025). In particular, the system can use an operation orchestrator to execute each worklet in a sequence defined by the customization module to generate a set of output data. In some examples, the customization module includes a local data bus, and the set of worklets are communicatively coupled to each other by the local data bus. In this case, the operation orchestrator provides data to each worklet over the local data bus. In some examples, the system executes the worklets in a concurrent (e.g., parallel) manner.

The system can send the output data to the common data bus (1030). The system can use the customization orchestrator to send the output data. The output data includes data indicating the given digital component selected by the customization module based on the set of input data provided to the customization module. In some examples, the customization orchestrator can transform the output data into a defined set of outputs associated with the customization module.

In some examples, the system includes a policy engine, and the policy engine determines whether the output data adheres to a set of data policies. The policy engine determines whether the output data is sent to the common data bus based on whether the output data adheres to the set of data policies.

The system can then cause the client device to present the digital component (1035). If the customization modules are executed at the secure distribution system, the secure distribution system can provide the digital component to the client device to presentation. If some customization modules and/or the final selection of the digital component is performed at the client device, the client device can present the digital component after selection.

Figure 11:
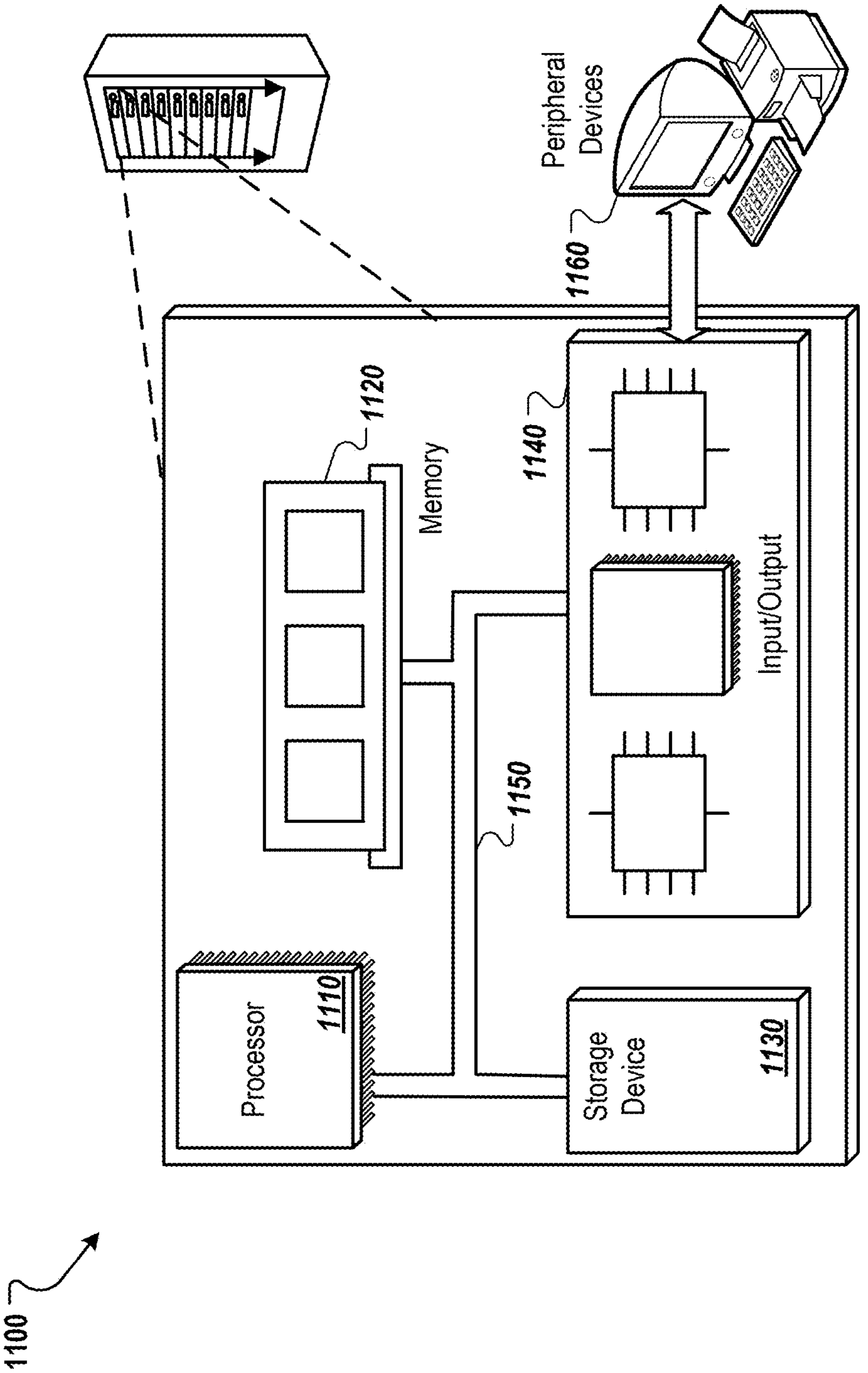
FIG. 11 is a block diagram of an example computer system.

FIG. 11 is a block diagram of an example computer system 1100 that can be used to perform operations described above. The system 1100 includes a processor 1110, a memory 1120, a storage device 1130, and an input/output device 1140. Each of the components 1110, 1120, 1130, and 1140 can be interconnected, for example, using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 can include, for example, a hard disk device, an optical disk device, a storage device that is shared over a network by multiple computing devices (e.g., a cloud storage device), or some other large capacity storage device.

The input/output device 1140 provides input/output operations for the system 400. In one implementation, the input/output device 1140 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 1160. Other implementations, however, can also be used, such as mobile computing devices, mobile communication devices, set-top box television client devices, etc.

Although an example processing system has been described in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:

receiving, by a secure distribution system and from a client device, a digital component request comprising a set of data;

in response to receiving the digital component request:

identifying, by a customization orchestrator of the secure distribution system, a multi-stage workflow for selecting a digital component from candidate digital components of a given content platform based on the set of data, wherein the multi-stage workflow comprises a sequence of customization modules that are communicatively coupled to one another by a common data bus, each customization module comprising a set of worklets comprising one or more customized worklets provided by the given content platform and one or more standard worklets used in customization modules of multiple content platforms;

executing, by the secure distribution system, each customization module of the multi-stage workflow according to the sequence of customization modules of the multi-stage workflow to select the digital component, the executing comprising:

for each respective customization module of the sequence of customization modules:

providing, by the customization orchestrator, a set of input data to the respective customization module over the common data bus;

executing each worklet of the respective customization module in a sequence defined by the respective customization module to generate a set of output data; and sending, by the customization orchestrator, the output data to the common data bus, wherein the output data for the respective customization module comprises data indicating a given digital component selected by the respective customization module based on the set of input data provided to the respective customization module; and causing the client device to present the given digital component.

2. The computer-implemented method of claim 1, further comprising:

receiving, from the common data bus, respective candidate digital components from multi-stage workflows of multiple content platforms including the given digital component from the multi-stage workflow of the given content platform; and selecting, by the secure distribution system, the given digital component from among the candidate digital components.

3. The computer-implemented method of claim 1, wherein:

each worklet of each set of worklets includes an operation defined by a portion of code configured to process data, wherein the portion of code of the operation associated with each customized worklet is a customized portion of code provided by the given content platform, and wherein the portion of code of the operation associated with each standard worklet is a portion of code defined by an entity that manages operation of the secure distribution system.

4. The computer-implemented method of claim 1, wherein the customization orchestrator transforms the set of input data into a defined set of inputs associated with the respective customization module.

5. The computer-implemented method of claim 1, wherein the customization orchestrator transforms the output data into a defined set of outputs associated with the respective customization module.

6. The computer-implemented method of claim 5, wherein each customization module further comprises a policy engine, wherein the policy engine determines whether the set of input data and the output data adhere to a set of data policies.

7. The computer-implemented method of claim 6, wherein the policy engine determines whether the set of input data is provided by the customization orchestrator to the respective customization module based on whether the set of input data adheres to the set of data policies.

8. The computer-implemented method of claim 6, wherein the policy engine determines whether the output data is sent by the customization orchestrator to the common data bus based on whether the output data adheres to the set of data policies.

9. The computer-implemented method of claim 1, wherein the common data bus is a common data bus comprising one or more data channels, and wherein each data channel of the one or more data channels is a user data channel, a candidate data channel, a contextual data channel, or an auxiliary data channel.

10. The computer-implemented method of claim 1, wherein each respective customization module further comprises a local data bus, wherein the set of worklets of each respective customization module are communicatively coupled to one another by the local data bus.

11. The computer-implemented method of claim 10, wherein each respective customization module comprises an operation orchestrator configured to transfer data between the set of worklets over the local data bus.

12. The computer-implemented method of claim 1, wherein one or more of the respective customization modules are located in a trusted execution environment on the secure distribution system, and one or more of the respective customization modules are located on the client device.

13. The computer-implemented method of claim 1, wherein executing, by the secure distribution system, each respective customization module of the multi-stage workflow according to the sequence of customization modules of the multi-stage workflow to select the digital component, further comprises executing one or more respective customization modules in a concurrent manner.

14. The computer-implemented method of claim 1, wherein executing, by the customization orchestrator, each worklet of the respective customization module in a sequence defined by the respective customization module to generate a set of output data further comprises executing one or more worklets in a concurrent manner.

15. A system comprising one or more computers and one or more storage devices storing instructions that when executed by the one or more computers cause the one or more computers to perform operations comprising:

receiving, by a secure distribution system and from a client device, a digital component request comprising a set of data;

in response to receiving the digital component request:

identifying, by a customization orchestrator of the secure distribution system, a multi-stage workflow for selecting a digital component from candidate digital components of a given content platform based on the set of data, wherein the multi-stage workflow comprises a sequence of customization modules that are communicatively coupled to one another by a common data bus, each customization module comprising a set of worklets comprising one or more customized worklets provided by the given content platform and one or more standard worklets used in customization modules of multiple content platforms;

executing, by the secure distribution system, each customization module of the multi-stage workflow according to the sequence of customization modules of the multi-stage workflow to select the digital component, the executing comprising:

for each respective customization module of the sequence of customization modules:

providing, by the customization orchestrator, a set of input data to the respective customization module over the common data bus;

executing each worklet of the respective customization module in a sequence defined by the respective customization module to generate a set of output data; and sending, by the customization orchestrator, the output data to the common data bus, wherein the output data for the respective customization module comprises data indicating a given digital component selected by the respective customization module based on the set of input data provided to the respective customization module; and causing the client device to present the given digital component.

16. One or more non-transitory computer-readable storage media storing instructions that when executed by one or more computers cause the one or more computers to perform operations comprising:

receiving, by a secure distribution system and from a client device, a digital component request comprising a set of data;

in response to receiving the digital component request:

identifying, by a customization orchestrator of the secure distribution system, a multi-stage workflow for selecting a digital component from candidate digital components of a given content platform based on the set of data, wherein the multi-stage workflow comprises a sequence of customization modules that are communicatively coupled to one another by a common data bus, each customization module comprising a set of worklets comprising one or more customized worklets provided by the given content platform and one or more standard worklets used in customization modules of multiple content platforms;

executing, by the secure distribution system, each customization module of the multi-stage workflow according to the sequence of customization modules of the multi-stage workflow to select the digital component, the executing comprising:

for each respective customization module of the sequence of customization modules:

providing, by the customization orchestrator, a set of input data to the respective customization module over the common data bus;

executing each worklet of the respective customization module in a sequence defined by the respective customization module to generate a set of output data; and sending, by the customization orchestrator, the output data to the common data bus, wherein the output data for the respective customization module comprises data indicating a given digital component selected by the respective customization module based on the set of input data provided to the respective customization module; and causing the client device to present the given digital component.

17. The system of claim 15, wherein the operations comprise:

receiving, from the common data bus, respective candidate digital components from multi-stage workflows of multiple content platforms including the given digital component from the multi-stage workflow of the given content platform; and selecting, by the secure distribution system, the given digital component from among the candidate digital components.

18. The system of claim 15, wherein:

each worklet of each set of worklets includes an operation defined by a portion of code configured to process data, wherein the portion of code of the operation associated with each customized worklet is a customized portion of code provided by the given content platform, and wherein the portion of code of the operation associated with each standard worklet is a portion of code defined by an entity that manages operation of the secure distribution system.

19. The system of claim 15, wherein the customization orchestrator transforms the set of input data into a defined set of inputs associated with the respective customization module.

20. The system of claim 15, wherein the customization orchestrator transforms the output data into a defined set of outputs associated with the respective customization module.

* * * * *